UNITED STATES PATENT OFFICE.

HOWARD F. CHAPPELL, OF NEW YORK, N. Y.

PROTECTING REFRACTORY FURNACE-LININGS.

1,308,481. Specification of Letters Patent. Patented July 1, 1919.

No Drawing. Application filed June 12, 1918. Serial No. 239,668.

*To all whom it may concern:*

Be it known that I, HOWARD F. CHAPPELL, a citizen of the United States, residing at New York, in the county of New York, State of New York, have invented certain new and useful Improvements in Protecting Refractory Furnace-Linings; and I do hereby declare the following to be a full, clear, and exact description of the invention, such as will enable others skilled in the art to which it appertains to make and use the same.

The rapid development, within recent years of the means employed for firing metallurgical and other furnaces,—particularly by means of injector burners for oil, gas, powdered fuel and the like,—have permitted the attainment of correspondingly high temperatures in such furnaces and have exposed the refractory linings thereof to extraordinary demands upon their resistivity to fusion and disintegration. In those instances where the injector burners are of such a character as to produce a flame analogous to that of the blow pipe, these temperature conditions, to be resisted by the refractory furnace linings have been especially intensified, and, wherever the injector burner is supplied with powdered coal, as its fuel, the silica contained in the ash is carried by the products of combustion into contact with the furnace walls and lowers the fusion point of the refractories by combining therewith over their exposed surfaces so as to form at said surfaces compounds higher in silica content than the alumina-silica composition of the main body portion of the refractory. As a consequence, such linings deteriorate rapidly and require such frequent replacement as to be highly uneconomical and, in some instances, prohibitive for industrial uses under extremely high temperature conditions.

The purpose of the present invention is to meet these contingencies by supplying an appropriate means for counteracting and suppressing their prejudicial effect. To this end, as will hereinafter more fully appear, I supply to the surface of the refractory furnace lining, (to compensate for temperatures beyond the limit for which they are normally intended, or to compensate for the lowering of the fusion point of their exposed surfaces by silica brought in contact therewith from the ash of the powdered fuel employed, or in any other manner) an amount of finely-divided aluminiferous material, sufficiently rich in alumina to form, at the high temperatures prevailing in the furnace, a coating of such high fusion point as to restore or even to increase the normal heat resistivity of the refractories at their exposed surfaces. The aluminiferous material which I prefer for this purpose is finely-divided alumina and preferably alumina in the form of calcined alunite. As delivered from an inclined rotary kiln, of the cement-burning type, the calcined alunite contains notable quantities of potash, which is subsequently removed, as far as is commercially feasible, by a leaching operation. The leached calcined alunite, still containing traces of potash is, when dried and injected into the furnace, under the conditions hereinafter specified, available for the purposes of the invention. It is not necessary, however, to leach the calcined alunite, and in fact, the presence of the full amount of potash normally present in calcined alunite is apparently of advantage in the process.

The invention may be practised in various ways, all of which have the fundamental purpose of bringing the aluminiferous material into contact with the exposed surfaces of the alumina-silica refractories, at the time when those surfaces are at such a temperature as will make them sufficiently soft or plastic to take on the alumina. For instance, in applying the process to the protection of the alumina-silica refractory lining of a kiln of the slightly inclined rotary type employed in the cement-burning practice, it will be feasible and desirable to supply at the upper or feed end of the rotary kiln a charge of native alunite, at or about the time the operator starts the kiln, by the injection of the burning blast of powdered coal or other fuel. The speed of rotation of the kiln is so regulated that by the time the alunite reaches that zone of the kiln's interior which requires protection, the alunite will have been sufficiently broken up to present a body of calcine in finely-divided form. A portion of this finely-divided calcine, coming in contact continuously with the highly heated exposed surfaces of the zone to be protected, adheres to said surfaces which are in a condition of sufficient plasticity for that purpose, and there results an inner lining or coating at the high temperature zone which it is found is of such high fusion point as to effectively resist fusion.

In those instances where powdered coal is used as the fuel for the injector burner, and where the silica present in the ash of the coal is carried into contact with the exposed surfaces of the furnace lining, these particles of silica, which are themselves in a highly heated and semi-fused condition, tend to lower the fusion point of the refractories, as hereinbefore pointed out. To meet this condition, calcined alunite in its finely-divided form, may be delivered into the furnace in such manner as to be projected against the surfaces which are receiving the impact of the silica. This projection of the calcined alunite (either leached or unleached) can be effected by supplying the alunite to the injector burner itself so that it will issue from the injector burner pipe, or, in order that it may not interfere too much with the intensity of the flame, it may be injected through an independent pipe or pipes in such manner that it will impinge upon that portion of the zone of the furnace lining requiring protection.

Or, if the kiln is to be employed for the calcining of alunite, and is of the type wherein at the lower or exit end of the kiln the calcined alunite is discharged into an exterior receptacle, it will be feasible to so adjust the discharge end of the injector burner with respect to the usual stationary fire-box or hood which supports the injector burner which incloses the lower end of the kiln that the fine dust (consisting of calcined alunite) which is present at the discharge end of the kiln will be taken up with a swirling motion. This swirling motion is brought about by shutting the damper through which air is ordinarily admitted in the front wall of the fire-box or hood. The closing of the damper causes a cloud of calcined alunite dust to swirl into the fire-box and this settles on the surfaces of the bricks therein, so that if said bricks have become plastic and started to fuse, they would thereafter be protected from further depreciation.

So also, in similar cases, where the fire-boxes of kilns or of steam boiler furnaces have become endangered by the tendency of their lining to become plastic and to start to fuse, it is feasible to introduce by means of an air blower, or in any other suitable way, a cloud of alumina dust which settles upon the hot bricks and which combines with any fused cinder present so as to prevent corrosive action upon the bricks or upon the floor of the fire-box.

In so far as I am aware, it is broadly new to increase the fire-resisting and refractory properties of furnace linings by subjecting such linings while at a temperature sufficiently elevated to cause softening, sintering, or incipient fusion thereof, to the action of a material, in an extremely finely-divided state (like dust or powder) containing a higher percentage of alumina than the refractory lining itself, and having a fusion point higher than the refractory. This can be effected, as hereinbefore pointed out, in various ways, and constitutes the underlying or fundamental main characteristic feature of the invention, which, in its preferred use, involves the employment of leached or unleached calcined alunite as the aluminiferous material to be employed.

Having thus described my invention, what I claim is:

1. The method of protecting refractory furnace linings containing silica, from fusion and disintegration, which consists in supplying aluminiferous material in a finely-divided condition to the exposed surfaces of the lining when such surfaces are brought to such a temperature as to partially fuse or soften them; substantially as described.

2. The method of protecting refractory furnace linings containing silica, from fusion and disintegration, which consists in supplying finely-divided calcined alunite to the exposed surfaces of the lining when such surfaces are brought to such a temperature as to partially fuse or soften them; substantially as described.

3. The method of protecting refractory furnace linings containing silica, from fusion and disintegration, which consists in supplying finely-divided calcined and leached alunite to the exposed surfaces of the lining when such surfaces are brought to such a temperature as to partially fuse or soften them; substantially as described.

In testimony whereof I affix my signature.

HOWARD F. CHAPPELL.